US009005010B2

(12) United States Patent
Watkins et al.

(10) Patent No.: US 9,005,010 B2
(45) Date of Patent: Apr. 14, 2015

(54) WAGERING GAME METHOD, GAMING MACHINE, GAMING SYSTEM, AND PROGRAM PRODUCT PROVIDING AN ENHANCED TOURNAMENT AWARD FEATURE

(75) Inventors: Brian Watkins, Austin, TX (US); Clint Owen, Austin, TX (US); Allison Pope, Austin, TX (US); Michael Conway, Austin, TX (US); Charles Speer, Austin, TX (US)

(73) Assignee: Multimedia Games, Inc., Austin, TX (US)

(*) Notice: Subject to any disclaimer, the term of this patent is extended or adjusted under 35 U.S.C. 154(b) by 267 days.

(21) Appl. No.: 13/601,701

(22) Filed: Aug. 31, 2012

(65) Prior Publication Data

US 2013/0084948 A1 Apr. 4, 2013

Related U.S. Application Data

(60) Provisional application No. 61/541,888, filed on Sep. 30, 2011.

(51) Int. Cl.

| | |
|---|---|
| *A63F 9/24* | (2006.01) |
| *A63F 13/00* | (2014.01) |
| *G06F 17/00* | (2006.01) |
| *G06F 19/00* | (2011.01) |
| *G07F 17/32* | (2006.01) |

(52) U.S. Cl.
CPC .................................. *G07F 17/3276* (2013.01)

(58) Field of Classification Search
USPC ................. 463/10, 11, 14, 16, 20, 22, 23, 42; 273/292, 274
See application file for complete search history.

(56) References Cited

U.S. PATENT DOCUMENTS

2009/0088238 A1* 4/2009 Moody ........................... 463/13

* cited by examiner

*Primary Examiner* — Adetokunbo O Torimiro
(74) *Attorney, Agent, or Firm* — Russell D. Culbertson, Esq.; JP Cody, Esq.

(57) ABSTRACT

Gaming systems and methods provide a tournament game which selectively awards an enhanced tournament play result. The enhanced tournament play result may be of variable value which is selected for the given instance in order to place the receiving tournament player in some predetermined rank in the tournament. Such a variable enhanced tournament play result in the tournament game may be used to help keep all participants interested in the tournament, even those participants who trail the tournament leaders by a wide margin.

27 Claims, 9 Drawing Sheets

WAGERING GAME METHOD, GAMING MACHINE, GAMING SYSTEM, AND PROGRAM PRODUCT PROVIDING AN ENHANCED TOURNAMENT AWARD FEATURE

CROSS-REFERENCE TO RELATED APPLICATION

The Applicants claim the benefit, under 35 U.S.C. §119(e), of U.S. Provisional Patent Application No. 61/541,888, filed Sep. 30, 2011, and entitled "Wagering Game Method, Gaming Machine, Gaming System, and program Product Providing an Enhanced Tournament Award Feature." The entire content of this provisional application is incorporated herein by this reference.

COPYRIGHT NOTICE

A portion of the disclosure of this patent document contains material which is subject to copyright protection. The copyright owner has no objection to the facsimile reproduction of the patent document or the patent disclosure as it appears in the U.S. Patent and Trademark Office patent files or records, but otherwise reserves all rights.

BACKGROUND OF THE INVENTION

1. Field of the Invention

This invention relates to wagering games, gaming machines, gaming systems, and associated methods and program products which provide competitive play such as tournaments. More particularly, the invention relates to wagering games, gaming machines, and gaming systems which provide competitive play and also selectively provide an enhanced result in the competition to ensure that the player receiving the result at least temporarily reaches some predetermined ranking in the competition.

2. Description of the Related Art

Numerous types of wagering games have been developed in an attempt to provide players with new and varied gaming experiences. In addition to providing primary games, a gaming machine may offer one or more bonus or secondary games. These bonus or secondary games may be offered in an effort to vary the play at the gaming machine, and to offer enhanced prizes which help hold the player's interest. Gaming machines which offer wagering games may also provide competitive play in which players compete against each other in the play of a primary or other game offered through the gaming machine. Various prizes may be offered for the competition winner and high ranking players (such as the second and third place players for the competition). As used in this disclosure and the accompanying claims, any arrangement in which participants compete against each other and may see a relative ranking of participants during the course of the competition will be referred to as a tournament.

There remains a need in the field of wagering games for systems and arrangements to enhance the player's gaming experience and encourage the player to continue play at a given gaming facility. In particular, there remains a need for tournament systems which maintain player excitement and enhance the tournament experience.

SUMMARY OF THE INVENTION

Gaming systems and methods encompassing the present invention provide a tournament game which selectively awards an enhanced tournament play result. The enhanced tournament play result may be of variable value which is selected for the given instance in order to place the receiving tournament participant in some predetermined rank in the tournament. Such a variable enhanced tournament play result in the tournament game may be used to help keep all participants interested in the tournament, even those participants who trail the tournament leaders by a wide margin.

A method according to one form of the present invention includes receiving a tournament play input at a gaming machine, the tournament play input being associated with a tournament participant. This method also includes obtaining a tournament play result for the tournament play input, determining whether the enhanced tournament play result is to be awarded for the tournament play input. Where it is determined that the enhanced tournament play result is to be awarded for the tournament play input, the illustrative method further includes determining an enhanced tournament result value. This enhanced tournament result value comprises a value sufficient to place the tournament participant at a predetermined tournament ranking, such as first place for example. Once the value of the enhanced tournament result is determined, that result value may be awarded to the participant through their gaming machine. The method may then include displaying the tournament participant in the predetermined tournament ranking at a display device associated with the gaming machine. This display may include simply displaying the participant's name or some other designation associated with the participant in some graphic arrangement, such as a leader board for example, which indicates the participant's position in the tournament relative to other participants.

A gaming system embodying principles of the present invention may include one or more display devices and a player input system. Such a gaming system may also include at least one processor and at least one memory device. The memory device stores instructions which are executable by the at least one processor to selectively award the enhanced tournament result. In particular, the instructions are executable by the processor to receive the tournament play input, obtain the tournament play result for the tournament input, and determine whether the enhanced tournament play result is to be awarded for the tournament play input. Where it is determined that the enhanced tournament play result is to be awarded for the tournament play input, the instructions are executable to determine the enhanced tournament result value and award that tournament result value to the respective tournament participant. Finally, the stored instructions are executable to cause the tournament participant (their likeness, name, or handle) to be displayed in the predetermined tournament ranking.

Considering that the invention may be implemented through a gaming machine which operates under the control of a general purpose processor, the invention further encompasses a program product stored on one or more tangible data storage devices. The program product may include player input program code, tournament program code, enhancement control program code, and tournament display program code. The player input program code may be executable to receive a tournament play input through a gaming machine, while the tournament program code may be executable to obtain a tournament play result for the tournament play input. The enhancement control program code may be executable to determine whether an enhanced tournament play result is to be awarded for the tournament play input, and, where it is determined that the enhanced tournament play result is to be awarded for the tournament play input, determine the enhanced tournament result value and award that result value to the participant. The tournament display program code may be executable to display the tournament participant (their likeness, name, or handle) in the predetermined tournament ranking at a display device associated with the gaming machine.

These and other advantages and features of the invention will be apparent from the following description of illustrative embodiments, considered along with the accompanying drawings.

DESCRIPTION OF ILLUSTRATIVE EMBODIMENTS

Figure 6:
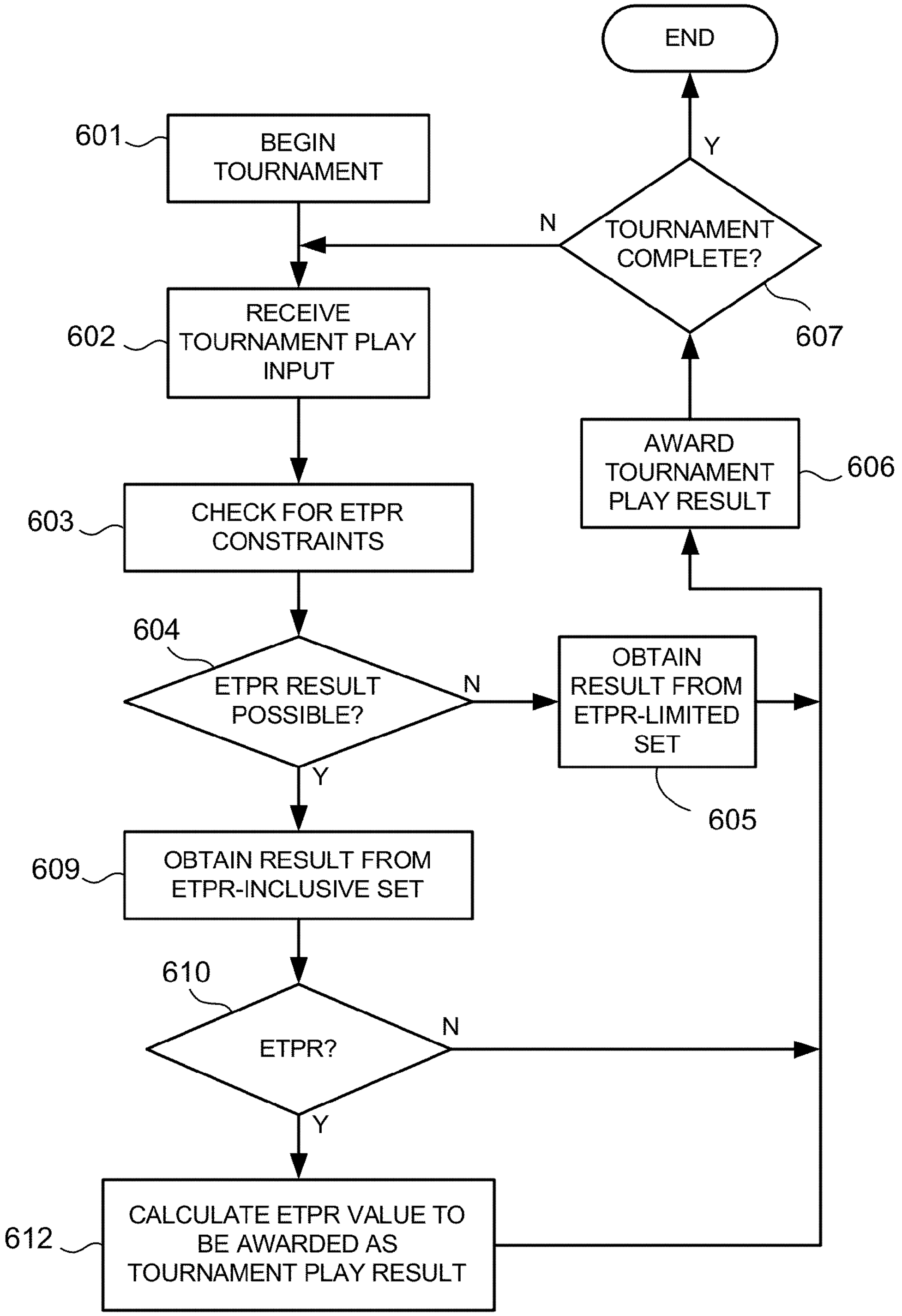
FIG. 6 is a flow chart showing one process by which an enhanced tournament play result may be awarded in tournament play.
Figure 7:
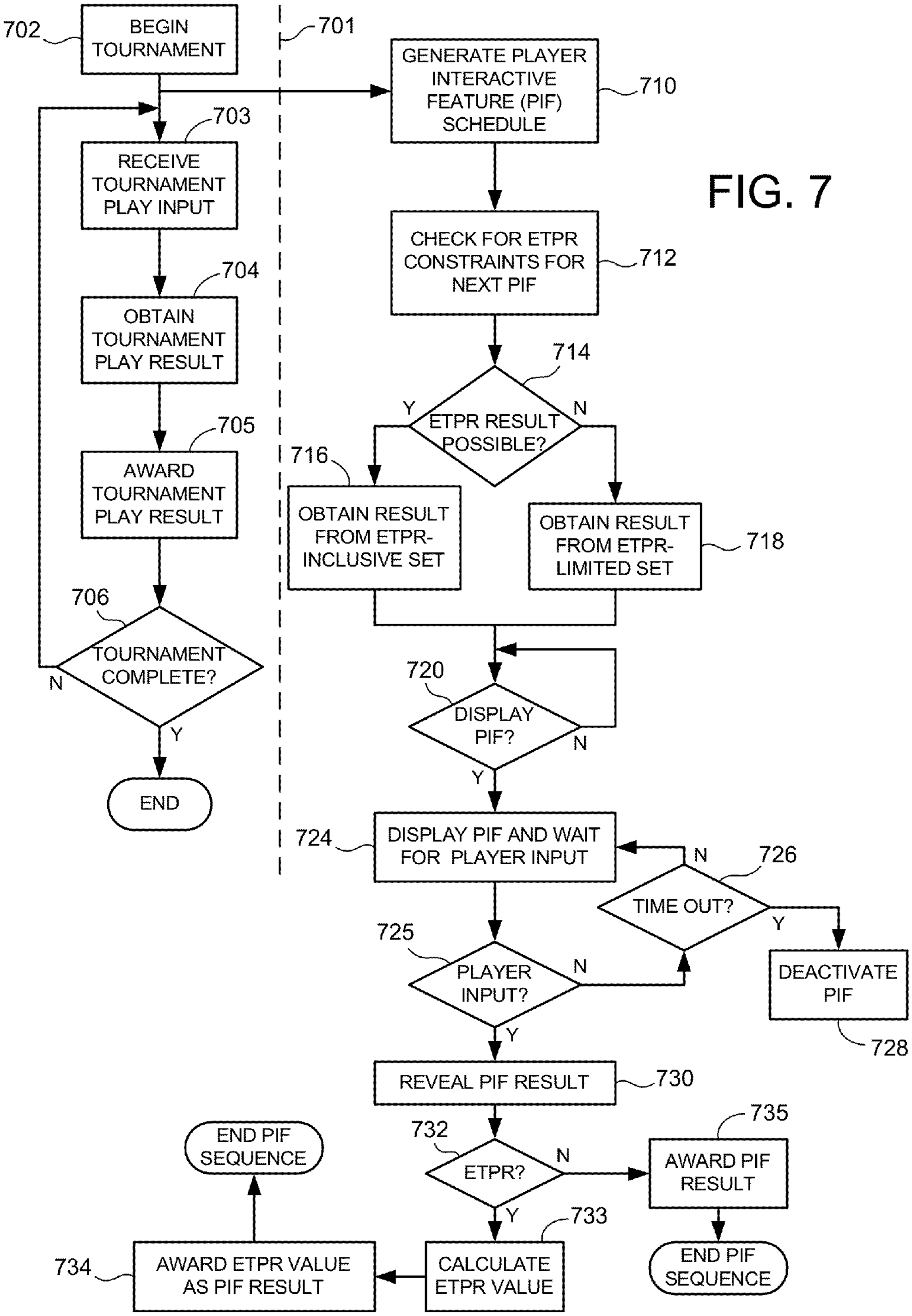
FIG. 7 is a flow chart showing an alternate process by which an enhanced tournament play result may be awarded according to the present invention.
Figure 8:
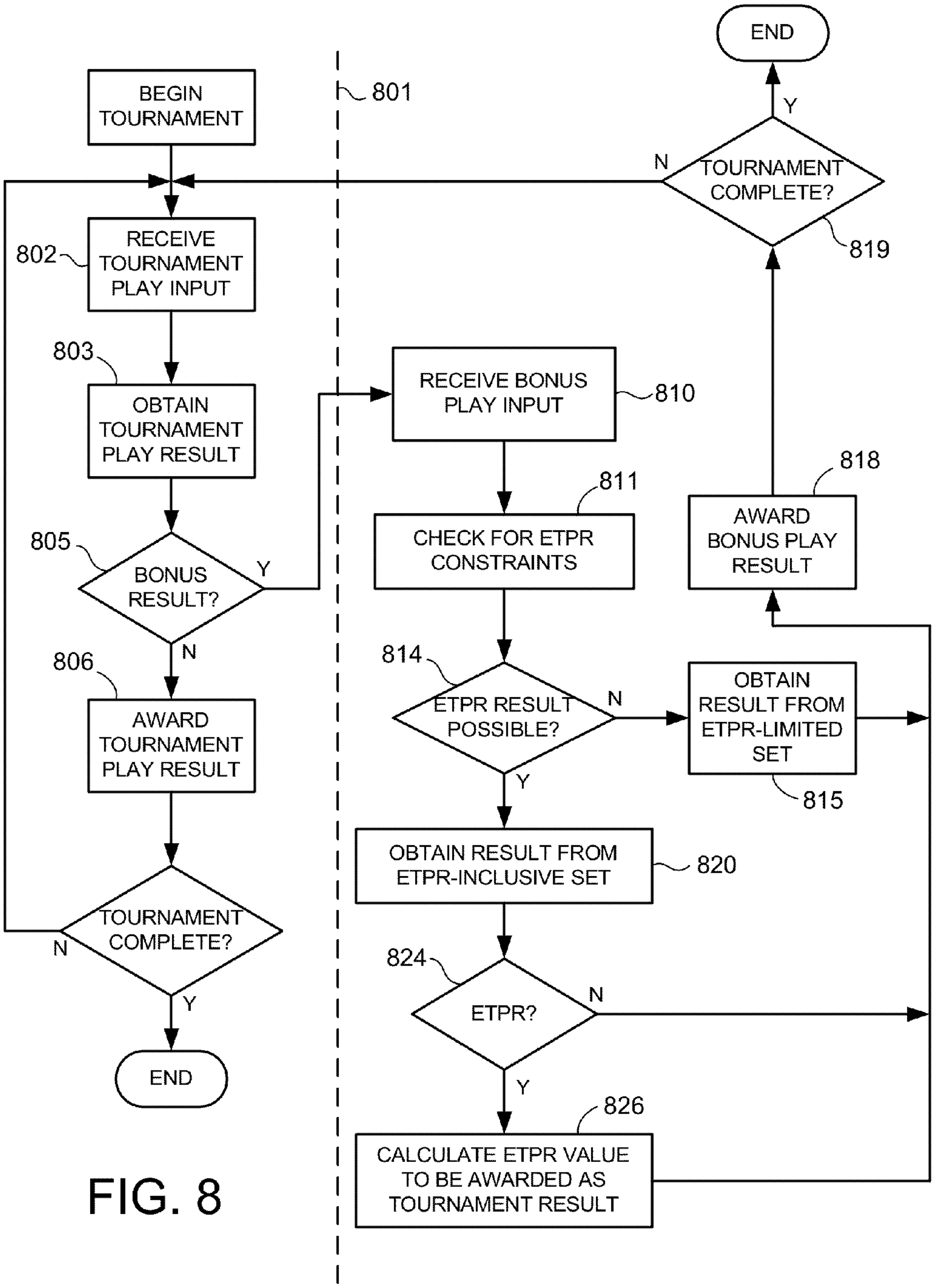
FIG. 8 is a flow chart showing another alternate process by which an enhanced tournament play result may be awarded according to the present invention.

In the following description, FIGS. 1-5 will be used to describe gaming machines embodying principles of the invention, and a gaming network in which the gaming machine may be connected. FIGS. 6-8 will be used to describe various alternate processes by which an enhanced tournament play result may be awarded according to the present invention, and FIG. 9 will be used to describe an example process for calculating the value of an enhanced tournament play result. FIG. 10 will be used to describe a process for controlling the ranking display after awarding an enhanced tournament play result.

Figure 1:
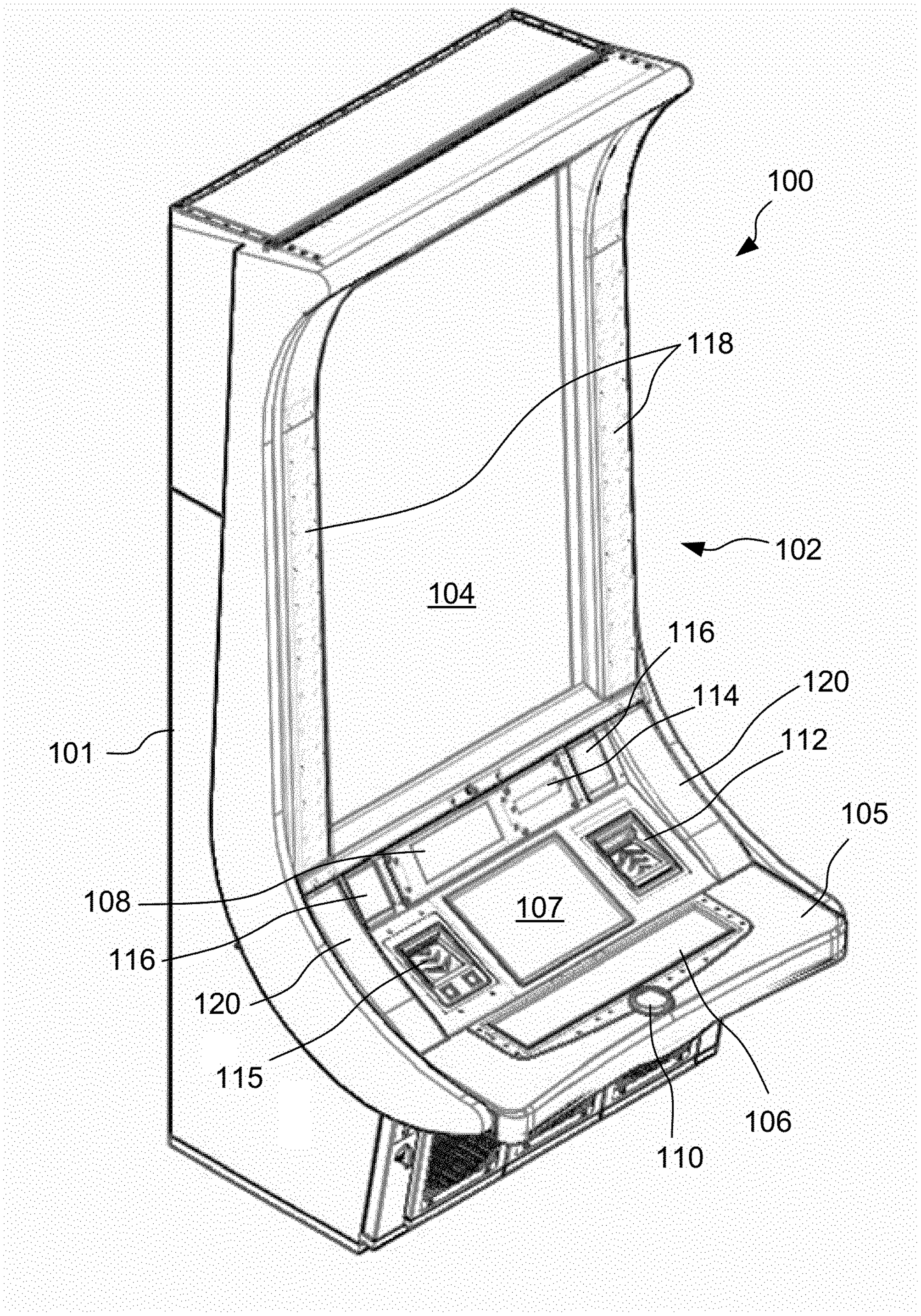
FIG. 1 is an isometric view of a gaming machine which may be used in various embodiments of the present invention.

Referring to FIG. 1, a gaming machine 100 includes a cabinet 101 having a front side generally shown at reference numeral 102. A primary video display device 104 is mounted in a central portion of the front surface 102, with a button panel 106 positioned below the primary video display device and projecting forwardly from the plane of the primary video display device. In this particular implementation, button panel 106 comprises a touch screen display device mounted in an arm rest structure 105. In addition to primary video display device 104, the illustrated gaming machine 100 includes a feature club video display device 107 ("feature club display 107") which is also preferably a touch screen display and is positioned in between the primary video display device and button panel 106. The display surface of feature club display 107 is inclined at an angle to provide a comfortable viewing angle to a player standing or sitting in front of gaming machine 100 with their hands in position to reach button panel 106, the feature club display 107, and perhaps the lower portion of primary display device 104. Gaming machine 100 also includes an additional smaller auxiliary display device 108 located between primary display device 104 and feature club display 107. Auxiliary display device 108 may also comprise a touch screen device. It should also be noted that each display device referenced herein may include any suitable display device including a cathode ray tube, liquid crystal display, plasma display, LED display, OLED display, or any other type of display device currently known or that may be developed in the future. As will be described further below in connection with FIG. 2 and elsewhere, it is also possible for gaming machines within the scope of the present invention to include mechanical elements such as mechanical reels.

The gaming machine 100 illustrated for purposes of example in FIG. 1 also includes a mechanical control button 110 mounted on arm rest structure 105. Mechanical control button 110 may comprise a "Play" button which may be used in initiate a play in a game at the gaming machine, or may comprise a programmable, multi-function button. It will be appreciated that virtual buttons or other controls to allow a player to select a bet level, select pay lines, select a type of game or game feature, and actually start a play in a primary game may also be implemented on touch screen button panel 106. Other forms of gaming machines through which the invention may be implemented may include switches, joysticks, buttons, or other mechanical input devices, along with the virtual buttons and other controls implemented on touch screen displays such as touch screen button panel 106. For example, the lower areas of primary video display device 104 in gaming machine 100 provides a convenient display device for implementing touch screen controls in addition to or in lieu of mechanical controls or touch screen controls located elsewhere. Mechanical input devices in addition to the single mechanical button 110 may be conveniently located in areas of arm rest 105 not taken up by touch screen devices. The mechanical or touch screen-implemented player interface devices which receive player inputs to initiate the play of a game through the gaming machine, such as controls to select a wager amount for a given play and control to actually start a given play, may be referred to generally as a player interface system.

It will be appreciated that gaming machines may also include a number of other player interface devices included in the player interface system in addition to devices that are considered player controls for use in playing a particular game. Gaming machine 100 also includes a currency/voucher acceptor 112, a player card reader having a player card input 114, and a voucher/receipt printer 115. Numerous other types of player interface devices may be included in gaming machines that may be used according to the present invention.

A gaming machine which may be used to implement embodiments of the present invention may also include a sound system to provide an audio output to enhance the user's playing experience. For example, illustrated gaming machine 100 includes speakers 116 which may be driven by a suitable audio amplifier (not shown) to provide a desired audio output at the gaming machine. An additional speaker may be included above primary display device 104, but is not shown in the perspective of FIG. 1.

Gaming machine 100 further includes a cabinet accent lighting system for providing accent lighting effects in coordination with events at the gaming machine or otherwise. The illustrated embodiment includes a cabinet accent lighting system having elongated upper accent light fixtures 118 which may include a number of LEDs or other types of lights to provide various lighting effects on either side of primary display device 104. Lower elongated accent light fixtures 120 are also included on either side of the cabinet 101 between the level of primary display device 104 and touch screen button panel 106.

As will be described further below, feature club display 107 makes up the primary player input device for the feature club interface system of illustrated gaming machine 100. Although mechanical buttons may be located around the periphery of feature club display 107, this display provides a convenient location for many of the graphic presentations that may be displayed to the player in implementations of the feature club system. A touch sensitive surface associated with feature club display 107 provides a convenient location for receiving feature club inputs as will be described below.

Figure 2:
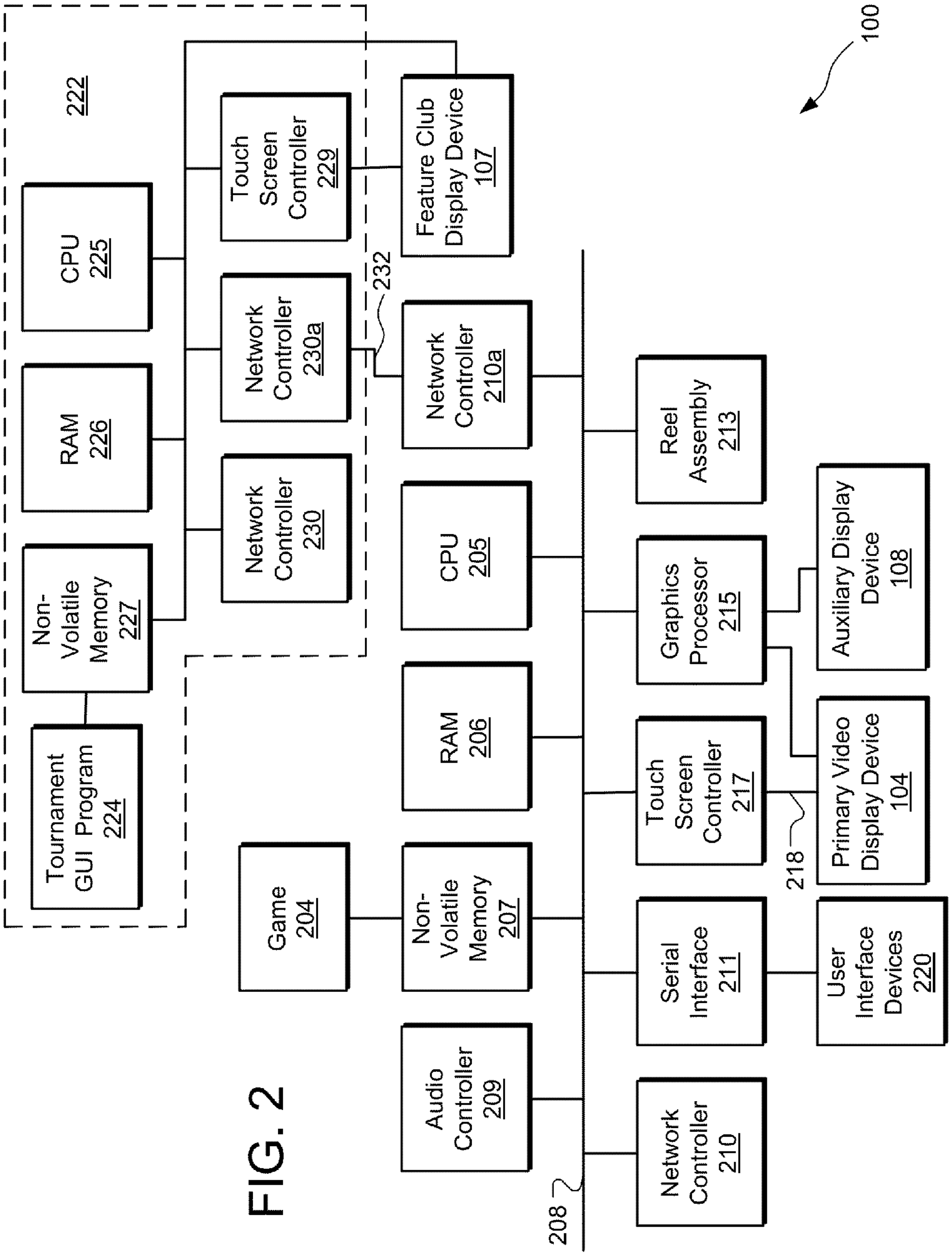
FIG. 2 is a diagrammatic representation showing various components of a gaming machine which may be employed according to one or more embodiments of the present invention.

FIG. 2 shows a diagrammatic representation of gaming machine 100 which includes a central processing unit (CPU) 205 along with random access memory (RAM) 206 and non-volatile memory or storage device 207. All of these devices are connected on a system bus 208 with an audio controller 209, a network controller 210, a second network controller 210*a*, and a serial interface 211. A graphics processor 215 is also connected on bus 208 and is connected to drive primary video display device 104 and auxiliary display device 108 (both mounted on cabinet 101 as shown in FIG. 1). As shown in FIG. 2, gaming machine 100 also includes a touch screen controller 217 connected to system bus 208. Touch screen controller 217 is also connected via signal path 218 to receive signals from a touch screen element associated with primary video display device 104. It will be appreciated that the touch screen element itself typically comprises a thin film that is secured over the display surface of primary video display device 104. The touch screen element itself is not illustrated or referenced separately in the figures.

The diagrammatic representation of FIG. 2 also shows gaming machine 100 as including a separate feature club interface processing system 222 which may comprise a single board computer. The second processing system 222 is included in the illustrated gaming machine 100 for controlling the feature club interface content displayed on touch screen feature club display device 107 and certain tournament system functions including communications with a feature club host server 406 tournament host server 410 (which are shown and will be described below in connection with FIG. 4) and communications with the game processor for the gaming machine, CPU 205.

Feature club interface processing system 222 includes CPU 225, with its own random access memory (RAM) 226, and non-volatile memory 227, such as a suitable disk-based or solid state hard drive for storing feature club graphical user interface program code 224 and any other program code which may be executed by CPU 225. Processing system 222 also includes network controllers 230 and 230*a*, and touch screen controller 229 connected to a suitable touch screen film or other touch-registering element associated with display device 107.

Those familiar with data processing devices and systems will appreciate that other basic electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, 210*a*, and 211 shown in FIG. 2 are elements commonly associated with a personal computer. These elements may be mounted on a standard personal computer chassis and housed in a standard personal computer housing which is itself mounted in cabinet 101 shown in FIG. 1. Alternatively, the various electronic components may be mounted on one or more circuit boards housed within cabinet 101 without a separate enclosure such as those found in personal computers. Feature club interface processing system 222 may comprise a single board computer mounted within cabinet 101 or within a separate EMI shielded enclosure within the cabinet. Those familiar with data processing systems and the various data processing elements shown in FIG. 2 will appreciate that many variations on this illustrated structure may be used within the scope of the present invention. For example, since serial communications are commonly employed to communicate with a touch screen controller such as touch screen controller 217, the touch screen controller may not be connected on system bus 208, but instead include a serial communications line to serial interface 211, which may be a USB controller or a IEEE 1394 controller for example. It will also be appreciated that some of the devices shown in FIG. 2 as being connected directly on system bus 208 may in fact communicate with the other system components through a suitable expansion bus. Audio controller 209, for example, may be connected to the system via a PCI bus. System bus 208 is shown in FIG. 2 merely to indicate that the various components are connected in some fashion for communication with CPU 205 and is not intended to limit the invention to any particular bus architecture. Numerous other variations in the gaming machine internal structure and system may be used without departing from the principles of the present invention. For example, a gaming machine in some embodiments of the present invention may rely on one or more data processors which are located remotely from the gaming machine itself. Embodiments of the present invention may include no processor such as CPUs 205 and 225 or graphics processor such as processor 215 at the gaming machine, and may instead rely on one or more remote processors.

It will also be appreciated that graphics processors are also commonly a part of modern computer systems. Although separate graphics processor 215 is shown for controlling primary video display device 104, CPU 205 may control all of the display devices directly without any intermediate graphics processor. Similarly, although processing system 222 is shown as including no separate graphics processor for controlling display device 107 (thus implying that the graphics processing for display device 107 is handled by CPU 225), implementations of the invention may include a processing system such as system 222 with a separate graphics processor. The invention is not limited to any particular arrangement of processing devices for controlling the video display devices included with gaming machine 100. Also, a gaming machine implementing the present invention is not limited to any particular number of video display devices or particular types of display devices.

In the illustrated gaming machine 100, CPU 205 executes software which ultimately controls primary game play and related functions and tournament game play including the receipt of player inputs and the presentation of the graphic symbols displayed in the course of game play through the display devices 104 and 108 associated with the gaming machine. CPU 205 also executes software related to communications handled through network interfaces 210 and 210*a*, and software related to various peripheral devices such as those connected to the system through audio controller 209, serial interface 211, and touch screen controller 217. CPU 205 may also execute software to perform accounting functions associated with play of the primary game. Random access memory 206 provides memory for use by CPU 205 in executing its various software programs while the nonvolatile memory or storage device 207 may comprise a hard drive or other mass storage device providing storage for game software such as game program code 204 prior loading into random access memory 206 for execution, or for programs not in use or for other data generated or used in the course of gaming machine operation. Network interface 210 provides an interface to other components of a gaming system in which gaming machine 100 may be included. An example network will be described below in connection with FIG. 4. Network interface 210*a* provides an interface to the separate processing system 222 via network controller 230*a* and crossover cable 232.

It should be noted that the invention is not limited to gaming machines employing the personal computer-type arrangement of processing devices and interfaces shown in example gaming machine 100. Other gaming machines through which the feature club system may be implemented may include one or more special purpose processing devices to perform the various processing steps for implementing the present invention. Unlike general purpose processing devices such as CPU 205, which may comprise an Intel Pentium® or Core® processor for example, these special purpose processing devices may not employ operational program code to direct the various processing steps.

The example gaming machine 100 which may be used to implement some embodiments of the present invention is shown in FIG. 2 as including user interface devices 220 connected to serial interface 211. These user interface devices may include various player input devices such as virtual buttons on touch screen button panel 106 in FIG. 1, and/or levers, and other devices. It will be appreciated that the interface between CPU 205 and other player input devices such as player card readers, voucher readers or printers, and other devices may be in the form of serial communications. Thus user serial interface 211 may be used for those additional devices as well, or the gaming machine may include one or more additional serial interface controllers. However, the interface between peripheral devices in the gaming machine, such as player input devices, is not limited to any particular type or standard for purposes of the present invention.

Reel assembly 213 is shown in the diagrammatic representation of FIG. 2 to illustrate that a gaming machine which may be used for various embodiments of the invention may include mechanical reels. For example, a set of mechanical reels may replace the primary display device 104, or at least part of that display device. Alternatively, mechanical reels may be included in the gaming machine behind a light-transmissive video display panel. Although the invention is not limited to any particular mechanical reel arrangement or control system, mechanical reels may be controlled conveniently through serial communications which provide instructions for a respective stepper motor for each reel. Thus some embodiments of the present invention which employ mechanical reels may use a serial interface device such as serial interface controller 211 to control communications with the reel assembly, and may not include a dedicated interface as indicated by FIG. 2. Details of a mechanical reel arrangement are not shown in the present figures so as to avoid obscuring the present invention in unnecessary detail.

It will be appreciated that the diagrammatic representation shown in FIG. 2 is shown only to provide an example of how gaming machine 100 may be configured for use in a tournament gaming system. Numerous variations on this generalized configuration are possible within the scope of the present inventions. For example, as noted above in connection with FIG. 2, alternative implementations may position the processing power provided by the CPUs at a location remote from the gaming machine itself. In configurations employing remote processing, the gaming machine would retain the display devices and user input devices and these devices would communicate with the remote processor or processors using a suitable interface. Also, feature club display device 107 may be controlled through processor 205 and without the separate processing system 222. Also, an alternate processing arrangement for controlling display device 107 may not communicate directly with the processing system including CPU 205.

Figure 3:
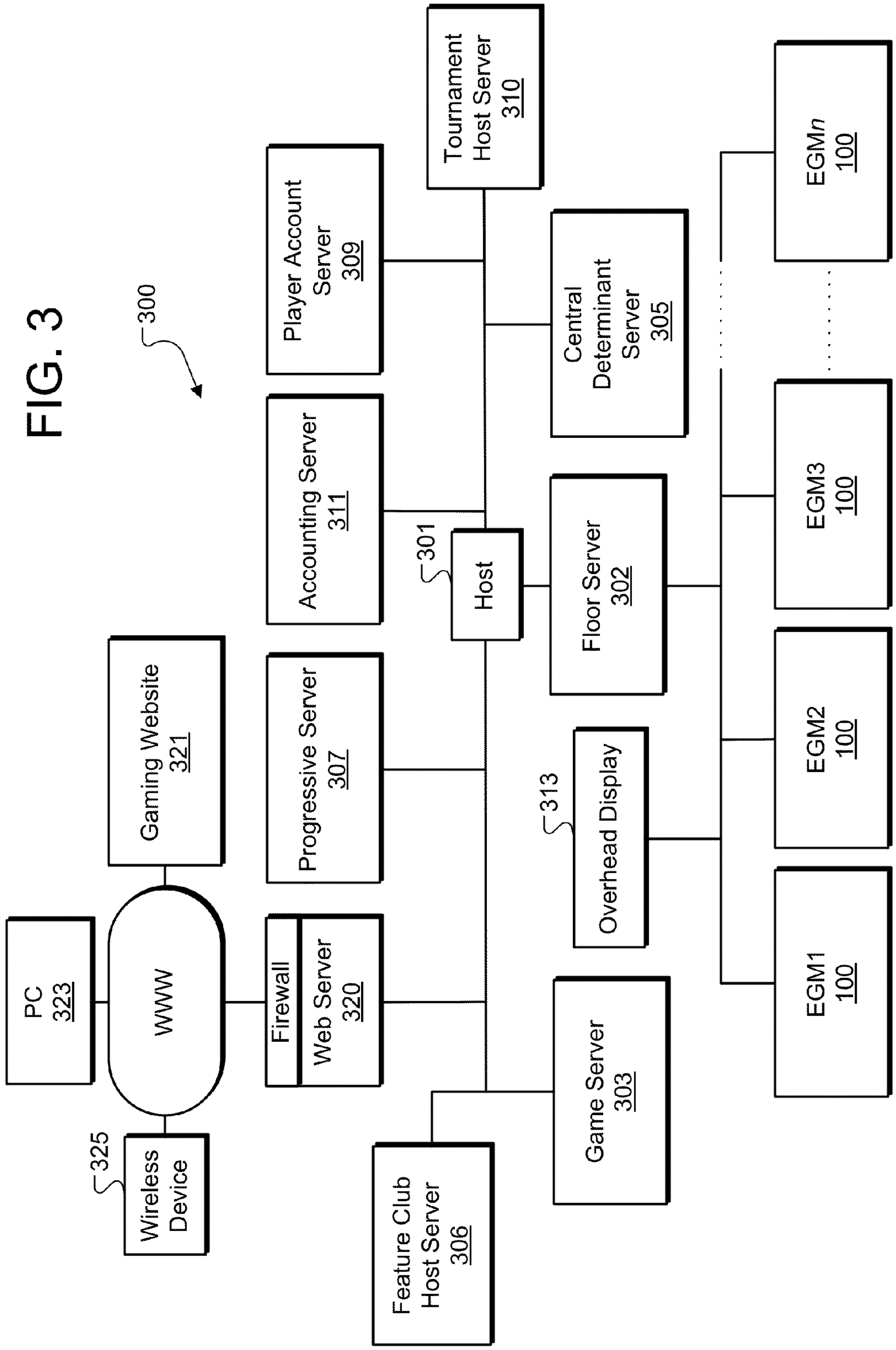
FIG. 3 is a diagram representation showing components of an alternative gaming machine which may be employed in a tournament gaming system according to various embodiments of the invention.

Referring now to FIG. 3, a networked gaming system 300 associated with one or more gaming facilities may include one or more networked gaming machines 100 (EGM1-$EGM_n$) connected in the network by suitable network cable or wirelessly.

The example gaming network 300 shown in FIG. 3 includes a host server 301 and floor server 302, which together may function as an intermediary between floor devices such as gaming machines 100 and back office devices such as the various servers described below. Game server 303 may provide server-based games and/or game services to network connected gaming devices such as gaming machines 100. Central determinant server 305 may be included in the network to identify or select lottery, bingo, or other centrally determined game outcomes and provide the information to networked gaming machines 100 providing lottery and bingo-based wagering games to players. Although not shown in FIG. 3, a gaming system having gaming machines 100 may also include a player club server. Such a player club server may be connected in the back office network together with progressive server 307, accounting server 311, player account server 309, tournament host server 310, web server 320 and feature club host server 306. The player club server may function to receive player club communications from the gaming machines 100 to maintain a player club account for each player enrolled in a player club. Alternatively, player club points and other information may be maintained through accounting server 311.

Feature club host server 306 includes a suitable processing device for receiving feature club input communications from the feature club interface systems associated with the various gaming machines 100, and sending the appropriate feature club output communications back to the gaming machines, and particularly to the respective feature club interface system associated with each respective gaming machine 100. Feature club host server 306 also maintains databases for tracking feature club points (which may include multiple different types of points) for each feature club enrollee, and perhaps other types of points or credits. Feature club host server 306 may also be accessed through suitable elements of network 300 to enroll players in the feature club and open feature club accounts. For example, the feature club interface system associated with a given gaming machine 100 may allow a player to enroll in the feature club and open a feature club account using various graphic displays presented on feature club display 107 in FIG. 1. Also, casino patrons may be allowed to open a feature club account through gaming website 321 or some other website hosted by web server 320.

Feature club host server 306 may also maintain databases relating activated or available features to the various player accounts. For example, implementations of a feature club system according to the present invention may allow feature club members to use their awarded feature club points to purchase features such as avatars, applications available through feature club display 107, and other types of features. Also, various features may be made available to feature club members based on various characteristics of the players, including total playing time, wagered amounts, etc. Feature club host server 306 may maintain all of this information related to the various feature club accounts using one or more databases.

Tournament host server 310 is included in network 300 for supporting the tournament-related processes which may be offered as a feature through a feature club interface system or otherwise. Tournament qualification and tournament game scoring processes may be performed through tournament host server 310 for example. In particular, tournament host server 310 may receive primary game play and wagering information and entry fee payment information from each gaming machine 100 in order to perform tournament qualification functions. Tournament host server 310 may also receive tournament play information from the various gaming machines 100 participating in a tournament, including a point total for the respective gaming machine. In one tournament implementation, each time a tournament score or point-affecting event occurs at a gaming machine 100, the gaming machine communicates an updated score to tournament host server 310. Once every set period of time (every three seconds for example), tournament host server 310 may determine a current point total for gaming machine 100 participating in the current tournament, rank the point totals to produce a ranking for at least some top number of tournament participants (top five or top ten for example), and then communicate that current ranking to the various participating gaming machines along with the point total for each rank position. The various gaming machines may use this ranking and point total information in calculating an enhanced tournament play result as will be described further below. Tournament host server 310 may also communicate ranking information and point information to a controller for an overhead display such as display 313.

Progressive server 307 may accumulate progressive awards by receiving defined amounts, such as a percentage of the wagers from eligible gaming devices or by receiving funding from marketing or casino funds. Progressive server 307 may also provide progressive awards to winning gaming devices in response to a progressive event. Such a progressive event may comprise, for example, a progressive jackpot game outcome or other triggering event such as a random or pseudo-random win determination at a networked gaming device or server. Accounting server 311 may receive gaming data from each of the networked gaming devices, perform audit functions, and provide data for analysis programs. Player account server 309 may maintain player account records, and store persistent player data such as accumulated player points in a player club system and/or player preferences (for example, game personalizing selections or options).

Networked gaming machines 100 (EGM1-EGMn) and one or more overhead displays 313 may be operatively connected so that the overhead display or displays may mirror or replay the content of one or more displays of gaming machines 100. For example, the primary display content for a given gaming machine 100 may be stored by a display controller or game processor 205 or tournament interface processor 225 of the given gaming machine and transmitted through network controller 210 as shown in FIG. 2 to a controller (not shown) associated with the overhead display(s) 313. In the event gaming machines 100 have cameras installed, the respective players' video images may be displayed on overhead display 313 along with the content of the player's gaming machine display.

Example gaming network 300 also includes a gaming website 321 which may be hosted through web server 320 and may be accessible by players via the Internet. One or more games may be displayed as described herein and played by a player through a personal computer 323 or handheld wireless device 325 (for example, a Blackberry® cell phone, Apple® iPhone®, personal digital assistant (PDA), iPad®, etc.). To enter website 321, a player may log in with a user name that may, for example, be associated with the player's account information stored on player account server 309. Once logged onto website 321 the player may play various games on the website. Also, website 321 may allow the player to make various personalizing selections and save the information so it is available for use during the player's next gaming session at a casino establishment having the gaming machines 100.

It will be appreciated that gaming network 300 illustrated in FIG. 3 is provided merely as an example of a gaming network in which tournaments may be offered according to embodiments of the present invention, and is not intended to be limiting in any way. In particular, servers shown separately in the example of FIG. 3 may be combined in a single physical processing device, or the processing duties of the various illustrated servers may be split into additional physical devices. Furthermore, a tournament gaming system according to one or more embodiments of the present invention may be implemented using any suitable network topology. For example, tournament host server 310 may be connected in a network with the various feature club interface processing systems 222 (in FIG. 2), and may communicate with other servers shown in FIG. 3 through a separate network.

Figure 4:
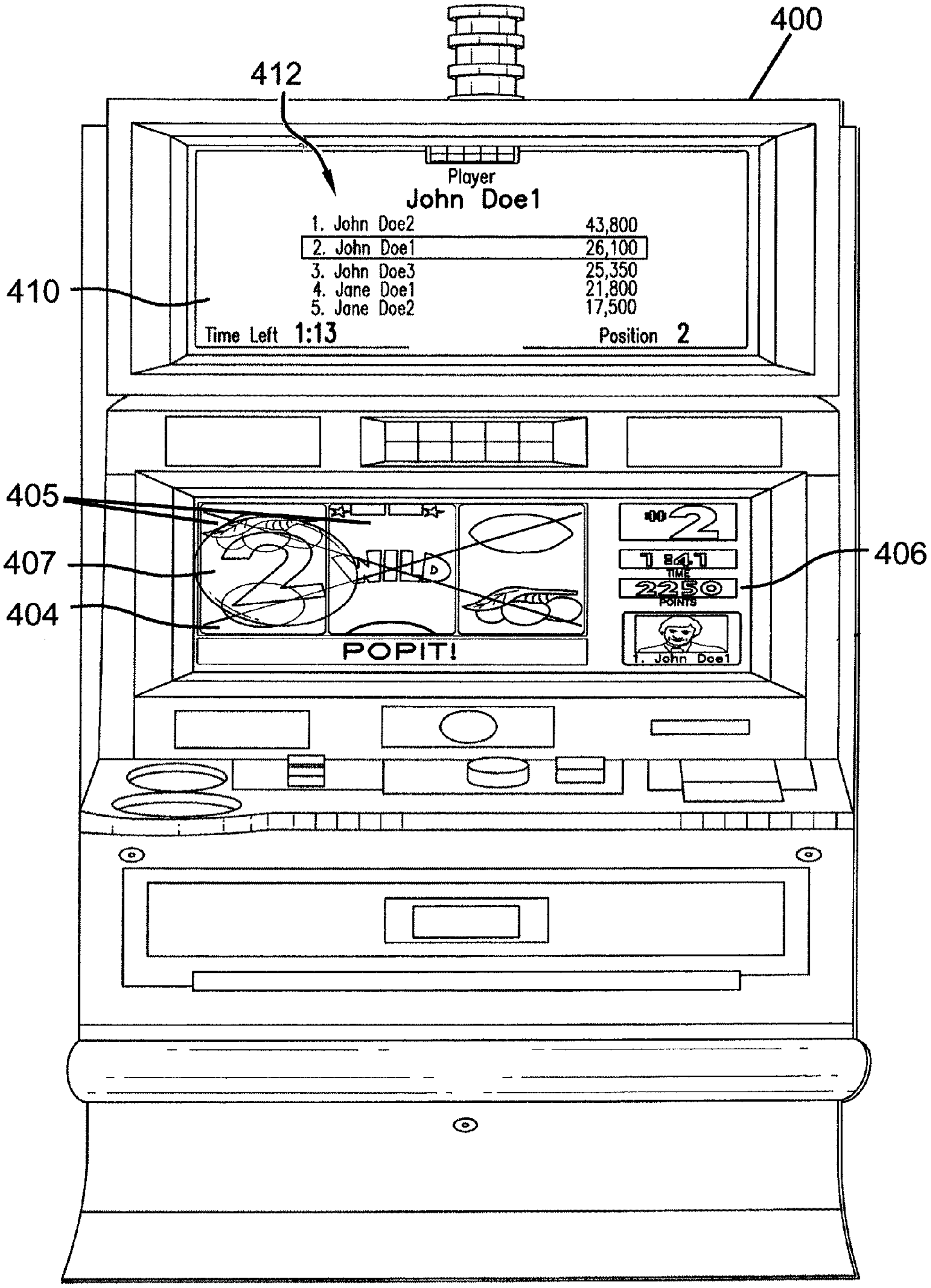
FIG. 4 is a representation of an alternate form of gaming machine which may be used in a tournament gaming system according to the present invention.

FIG. 4 shows an alternative gaming machine 400 which may be used to provide tournament play and an enhanced tournament play result according to the present invention. Gaming machine 400 includes primary display device 404 shown in a tournament configuration displaying a tournament reel-type game with three video-generated reels 405 along with a dashboard display 406 on the right side of the display device 404. A player interactive feature 407 is also shown on display device 404. As will be described below in connection with FIG. 7, the player/tournament participant may interact with interactive feature 407 during the course of the tournament to increase their tournament point total. Dashboard display 406 includes the player's current rank in the tournament, the time left in the tournament, the player's current tournament point total, and a video feed area which may show video of the player or other players in the tournament. Gaming machine 400 also includes an upper display device 410 which is shown displaying a leaderboard 412 for the tournament in which the player is participating.

It will be appreciated that gaming machine 400 is illustrated simply as another example of a gaming machine which may be used according to the present invention. Gaming machine 400 may include an internal structure similar to that shown in FIG. 2, but without the separate processing system 222 and feature club display device 107.

Figure 5:
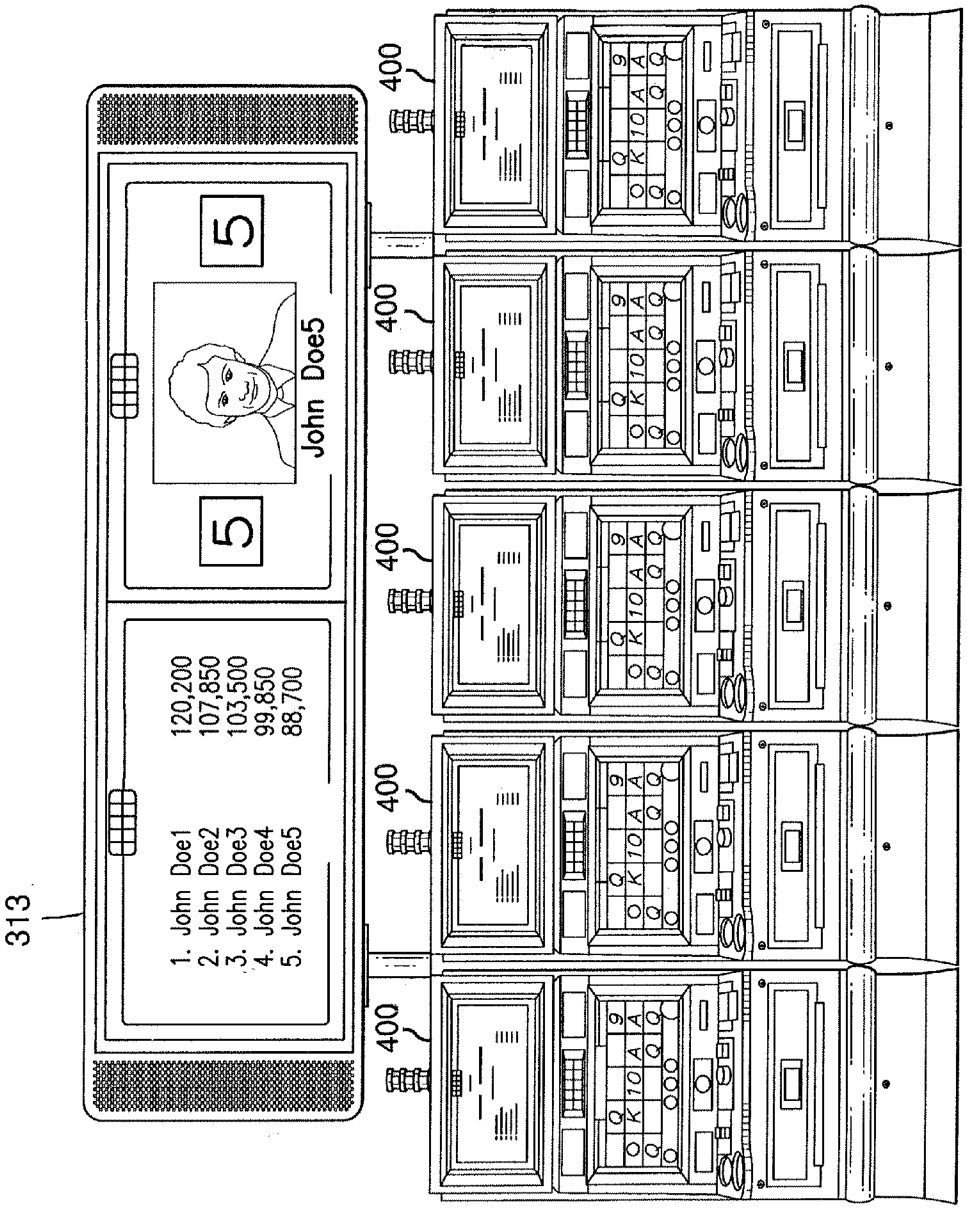
FIG. 5 is a representation of a bank of the alternate gaming machines shown in FIG. 4 along with an overhead display.

FIG. 5 shows a bank of the gaming machines 400 together with an overhead display 313 described above in connection with the network shown in FIG. 3. Among other uses, overhead display 313 may be used to display the top positions of a current leaderboard for a tournament which includes one or more of the gaming machines 400 in the bank. As shown in FIG. 5, overhead display 313 also displays an image of one or more of the current tournament leaders, indicating the displayed player's rank in the tournament. This player image display may cycle through the top five or some other number of tournament leaders.

The flowchart of FIG. 6 shows one process by which an enhanced tournament play result may be awarded to a player in the course of a tournament game according to the present invention. This particular flowchart shows the process that is performed at each gaming machine participating in the tournament. In this simple example, the player simply plays a tournament game offered through their respective gaming machine and an enhanced tournament play result, labeled "ETPR" in the figure is selectively awarded during the course of play. Once the tournament begins as shown at process block 601 in FIG. 6, the gaming machine receives a tournament play input as shown at process block 602. This tournament play input may simply be an input generated when the player at the gaming machine presses a play button or otherwise activates the gaming machine for a respective play in the tournament game. In this illustrative example, the process next checks for any constraints on awarding an enhanced tournament play result as shown at process block 603. Various types of constraints which may be considered in the process indicated at block 603 will be described further below. In any event, the check for constraints performed at process block 603 will determine whether an enhanced tournament play result is possible for the given tournament play input. The process then branches depending upon the outcome of the inquiry shown at decision block 604. If an enhanced tournament play result is not possible in view of the constraints in place as indicated by a negative outcome at decision block 604, the process branches to process block 605 to obtain a result from an "ETPR-limited set." This ETPR-limited set comprises a set of potential results which does not include an enhanced tournament play result. Once the result is obtained at process block 605, the process awards the result as shown at process block 606 and then the process returns for another tournament play input at process block 602 if the tournament is not over as indicated by a positive result at decision box 607.

Referring back to decision box 604, if an enhanced tournament play result is possible in view of the constraints check at process block 603, the process continues to process block 609 to obtain a result from an "ETPR-inclusive set." The ETPR-inclusive set comprises a set of potential results which includes an enhanced tournament play result as at least one of the possible results in the set. If the result obtained at process block 609 is not an enhanced tournament play result as indicated by a negative outcome at decision box 610, the process proceeds to process block 606 to award the result and then returns for another tournament play input if the tournament is not complete. However, if the result obtained at process block 609 is an enhanced tournament play result as indicated by a positive outcome at decision box 610, the process proceeds to calculate the value for the enhanced tournament play result as indicated at process block 612. Processes for calculating the value of an enhanced tournament play result will be described further below particularly in connection with FIG. 9. Once the value of the enhanced tournament play result is obtained at process block 612 the value is awarded to the player as the tournament play result for that play at process block 606. The process then continues to the inquiry at process block 607 to determine whether the tournament is complete or if the player may make another tournament play input at process block 602.

It should be noted here that the reference to the ETPR-inclusive and ETPR-limited sets in FIG. 6 and in any of the other figures in this application is not intended to limit the manner in which a result may be obtained for a given play. Results for a tournament play may be obtained in a random number generating process, random wheel stop process, through a lottery or bingo game, or in any other fashion within the scope of the present invention. References to obtaining a result from an ETPR-inclusive set are simply intended to convey that the result is obtained in such a way that it may comprise an enhanced tournament play result. Similarly, references to obtaining a result from an ETPT-limited set are simply intended to convey that the result which is obtained to be awarded for that play is obtained in such a way that it may not be an enhanced tournament play result. In fact, it is possible to use the same set of potential results as an ETPR-inclusive and ETPT-limited set depending upon how the result selection process is implemented. For example, the same set of potential results may be used at blocks 605 and 609 in FIG. 6 if the selection process is controlled at process block 605 such that an enhanced tournament play result may not be selected. Continuing with this example, a process in accordance with process block 605 may simply disregard an enhanced tournament play result if it is selected and make another selection until the obtained result is not an enhanced tournament play result.

FIG. 7 illustrates another process for awarding an enhanced tournament play result in the course of tournament play. In this particular process, the enhanced tournament play result is awarded in the course of a player interactive feature game which runs in parallel with a separate tournament game. An example of a parallel tournament game and player interactive feature game is shown in the example game illustrated in FIG. 4 shown on primary display 404. In this example, the tournament game includes a three-reel, reel-type game in which tournament play results correspond to various combinations and patterns of reel symbols which come to rest on the reels 405 for a given play in the reel-type tournament game. The tournament game further includes a player interactive feature game employing the graphic feature 407 superimposed over the reel display area. To play this player interactive feature game, the player selects the displayed feature in some fashion. For example, the player may select the feature 407 by touching the feature where the display comprises a touch screen display, or by using a pointing device of some sort to position a selection cursor over the feature. If the player selects the given player interactive feature in a given time frame, a tournament play result is revealed and awarded to the player to count toward the player's overall total for the tournament. Similarly to the process shown in FIG. 6, the process of FIG. 7 is conducted for a given tournament at each gaming machine participating in the given tournament.

Referring to FIG. 7, the process includes two parallel processes comprising a primary tournament game process shown generally to the left of dashed line 701, and a player interactive feature game process which is shown generally to the right of dashed line 701. Referring first to the primary tournament game shown to the left of dashed line 701, once the tournament begins as shown at process block 702, the process includes receiving a tournament play input as shown at process block 703, and obtaining a tournament play result for that input as shown at process block 704. The tournament play result from block 704 is then awarded to the player as shown at process block 705. If the tournament is not complete as indicated by a negative outcome at decision box 706, the process loops back to receive another tournament play input at process block 703. However, if the tournament is complete as indicated by a positive outcome at decision block 706, the entire process ends, that is, both the primary tournament game and the parallel player interactive feature game. It will be noted that the play in the primary tournament game shown in FIG. 7 is irrelevant to the possibility of obtaining an enhanced tournament play result in the tournament. Rather, an enhanced tournament play result may be awarded only through the player interaction feature game shown to the right of line 701.

The process for the player interaction feature (PIF) game includes first generating a schedule as indicated at process block 710. This schedule is preferably created in a random scheduling process and schedules the interactive features such as feature 407 shown in FIG. 4 to appear on the display of the gaming machine over the course of the tournament game. Once the schedule is created, the process shown in FIG. 7 includes checking for any applicable enhanced tournament play result constraints for the next player interactive feature to be shown according to the schedule ("enhanced tournament play result" again being abbreviated to ETPR in the figure). This checking process is shown at process block 712 in FIG. 7. The branch at decision box 714 is dependent upon whether there are any constraints for awarding an enhanced tournament play result for the next player interactive feature. If there are no constraints or if any constraints in place are not applicable at that particular time, then an enhanced tournament play result is possible and the process branches to process block 716 to obtain a result from an ETPR-inclusive set. However, if one or more constraints for the next player interactive feature prevent an enhanced tournament play result from being awarded for that feature, the process branches to obtain a result from an ETPR-limited set as shown at process block 718. It should be noted that the designations "ETPR-inclusive set" and "ETPR-limited set" are used here to have the same meaning as described above in connection with FIG. 6.

Once a result is obtained either at process block 716 or 718, the process continues on to decision box 720 which is associated with a determination of whether it is time to display a player interactive feature according to the schedule generated at process block 710. If not, the process simply holds in some suitable fashion to wait for the point in time in which the next player interactive feature is to be displayed. This delay indicated at decision box 720 may be performed in any suitable fashion. However, if the next player interactive feature is scheduled to be displayed, as indicated by a positive outcome at decision box 720, the process continues on to process block 724 according to which the player interactive feature is displayed (such as at 407 in FIG. 4) and the system awaits a player input to select the player interactive feature. If no player input is received as indicated by a negative outcome at decision box 725, the process loops to determine whether the time is up for interacting with that respective player interactive feature at decision box 726. If time remains for that player interactive feature, the process loops to wait for a player input. Otherwise, if the time is up for selecting that player interactive feature, the player interactive feature deactivates as indicated at process block 728. This deactivation may simply be that the player interactive feature disappears from the screen, however, regardless of how the respective player interactive feature deactivates, after this point that particular player interactive feature cannot be selected to affect the player's tournament score.

If the player makes a proper input to select the player interactive feature as indicated by a positive outcome at decision box 725, the process proceeds to process block 730 to reveal the result, if any, associated with that player interactive feature. If the result associated with the player interactive feature is an enhanced tournament play result as indicated by a positive outcome at decision box 732, the process proceeds to calculate the value for the enhanced tournament play result as indicated at process block 733, and then that calculated value is awarded as indicated at process block 734, after which the player interactive feature sequence ends for that particular player interactive feature. If the result revealed at process block 730 is not an enhanced tournament play result as indicated by a negative outcome at decision block 732, the process proceeds to award whatever result is associated with that particular player interactive feature as indicated at process block 735 and then the player interactive sequence ends for that particular player interactive feature.

It will be appreciated that the process shown from process block 712 down in the direction of process flow in FIG. 7 is performed for each player interactive feature to be displayed according to the schedule produced at process block 710. Therefore, depending upon the schedule and depending upon when a player selects a given player interactive feature to reveal the result associated therewith, there may be one or multiple player interactive features displayed on the display 404 at a given point in time. It will also be noted that there is no check for tournament completion associated with the process below process block 712 in the direction of process flow in FIG. 7. This is because the player interactive features are displayed only in accordance with the schedule produced at process block 710 and that schedule is produced in light of the time period available for that tournament. That is, the schedule produced at process block 710 does not schedule a player interactive feature to appear on the display after the tournament is complete.

The alternative process for conducting a tournament and awarding an enhanced tournament play result shown in FIG. 8 is similar to that shown in FIG. 7 in that the tournament play includes a primary tournament game and another game. The primary tournament game process is shown generally to the left of line 801 while the other tournament game, a bonus game, is shown generally to the right of line 801 in the figure. According to this alternative process, an enhanced tournament play result is awarded only in the play of the bonus game and not in the main tournament game.

Referring first to the primary tournament game, the process includes receiving a tournament play input as shown at process block 802 and then obtaining a tournament play result as shown at process block 803. In this example, the results in the main tournament game obtained at process block 803 may comprise a result that entitles the player to play the bonus game. However other results simply award a tournament play result. If the result is not a result that entitles the player to a bonus play, the process continues from decision box 805 to award the tournament play result as shown at process block 806. If the tournament is not complete, the process loops back to receive another tournament play input at process block 802, otherwise, the process ends.

If the result obtained at process block 803 is a result that entitles the player to a bonus play, the process branches to begin the bonus game shown to the right of line 801. In particular, the process includes first receiving a bonus play input from the player as shown at process block 810. The process then checks for any constraints that would prevent an enhanced tournament play result from being awarded as indicated at process block 811. If the process is constrained from awarding an enhanced tournament play result as indicated by a negative outcome at decision box 814 the process branches to obtain a result from an ETPR-limited result set as indicated at process block 815. This result is then awarded as indicated at process block 818 and then the process returns to receive another input at process block 802 if the tournament is not complete according to the result at decision box 819.

If there are no constraints on awarding an enhanced tournament play result according to the check at process block 811, the process continues on from decision box 814 to obtain a result from an ETPR-inclusive result set according to process block 820. As indicated by the outcome at decision box 824, if the result obtained at process block 820 is not an enhanced tournament play result, the process continues to block 818 to award whatever bonus result was selected at process at block 820. If the outcome obtained at process block 820 is an enhanced tournament play result as indicated by a positive outcome at decision box 824, the process includes calculating the value of the result as indicated at process block 826 and then awarding that calculated value as the bonus play result according to process block 818.

It will be appreciated that numerous variations are possible on the three alternative processes described in FIGS. 6, 7, and 8. For example, rather than a parallel game which requires player interaction as shown at decision box 725 in FIG. 7, the parallel game may not require any player input, and may simply select or reveal a result randomly or according to some other process. As another example of a non-player interactive variation, the bonus process shown to the right of line 801 in FIG. 8 may be conducted in parallel with the primary tournament game shown to the left of line 801 so that the bonus play does not interrupt the play in the primary tournament game. It is also possible for the present invention to be implemented without applying any constraints on whether an enhanced tournament play result may be awarded for a given tournament play or bonus play. In the process of FIG. 6, the game may comprise a reel-type game and one or more of the potential results could be designated as an enhanced tournament play result, for example a scatter bonus or special symbol on reels 1, 3, and 5 of a five reel game. The game could also be a wheel spinning game or a picking game. In the player interactive feature example of FIG. 7, the player interactive feature which will pay the enhanced tournament play result may comprise a special symbol which is identifiable to the player as paying the enhanced award.

Where constraints are employed, any one or more constraint may be used to prevent the system from awarding an enhanced tournament play result for a given play. For example, an enhanced tournament play result may be available only during certain periods of a tournament, such as from the one minute mark to the two and one-half minute mark. If a gaming machine has already been awarded an enhanced tournament play result in a tournament, the gaming machine may not be eligible for another such result or there may be some maximum number of such awards available in a given tournament. An enhanced tournament play result may also only be available to players sufficiently far behind in the tournament. For example, an enhanced tournament play result may only be available to players who are in worse than third place (that is, where at least three other players have more total credits), or it may only be available to players who are more than a certain threshold credit value behind the tournament leader. As an alternative to restricting an enhanced tournament play result only to players sufficiently far behind, there could instead be a rule which awards a prize for the enhanced tournament play result which is either an award calculated to place the player in a desired ranking in the tournament, or a certain flat credit prize (for example, 10,000 credits), whichever of the two is greater. This calculated variable prize or flat prize avoids the undesirable case of awarding an inconsequentially small prize value for the enhanced tournament play result when it is hit by a player who is already well-placed in the tournament, by instead awarding a substantial flat prize value in this case.

Figure 9:
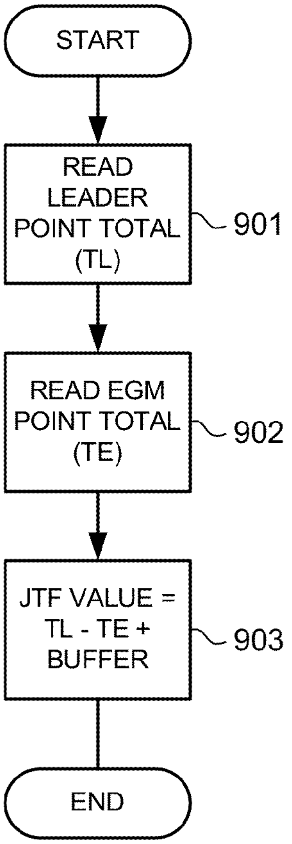
FIG. 9 is a flow chart illustrating an example process for calculating a value for an enhanced tournament play result according to one form of the invention.
Figure 10:
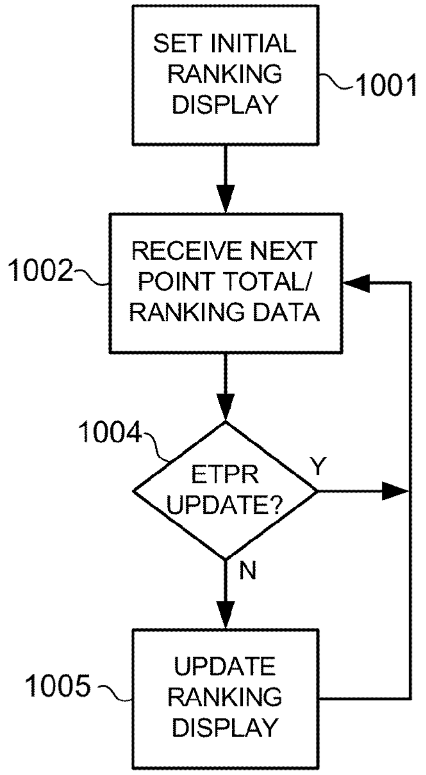
FIG. 10 is a flow chart illustrating an example process for controlling a ranking display according to one or more embodiments of the present invention.

FIG. 9 shows one example process for calculating the value for an enhanced tournament play result according to process blocks 826 in FIG. 8, 733 in FIGS. 7, and 612 in FIG. 6. In this example, the enhanced tournament play result value is equal to the current leader point total minus the current point total for the particular gaming machine plus a buffer value. Thus the process of FIG. 9 includes first reading the leader point "TL" as indicated at process block 901, and also reading the point total for the particular gaming machine "TE" as shown at process block 902. The process then does the required calculation to arrive at the enhanced tournament play result value as indicated at process block 903. In some implementations of the invention, each gaming machine in a tournament periodically obtains the leader point total from the tournament server such as server 310 shown in FIG. 3. In particular, the system may be configured such that the tournament server communicates the point totals for the leader and perhaps other top ranking players periodically such as every 3 seconds so that each gaming machine may display a leaderboard showing the desired number of leaders. In this case, reading the leader point total includes simply reading the most recent leader point total which has been communicated to the gaming machine from the tournament server. In alternative arrangements, each gaming machine may query the tournament server for the current leader point total. In any event, the point total for the gaming machine is preferably continuously maintained by the gaming machine and thus the step at process block 902 simply reads the current point total maintained for the gaming machine.

A buffer value which may be some fixed number of points may be used to calculate the value for the enhanced tournament play result in order to ensure that awarding the enhanced tournament play result actually places the player in the lead for the tournament. That is, the inclusion of the buffer value helps compensate for any delay in the data used for the leader point total which could prevent the award of the enhanced tournament play result from placing the player in the desired ranking.

It will be appreciated that the desired ranking assumed for purposes of FIG. 9 is first place in the tournament. Thus the point total read at process block 901 is the leader point total. However, the invention is not limited to an enhanced tournament play result award intended to place the receiving player in first place or any other ranking. Rather, the award may be intended to place the player in second place, third place, or any other desired rank. The desired rank may be determined randomly on each calculation or determined in any other fashion.

FIG. 10 illustrates a process which also addresses a delay in obtaining the most current point total for the calculation of the enhanced tournament play reserve result value. Where there is a delay in each gaming machine receiving, for example, the leader point total, it is possible that, even using the buffer described above in connection with FIG. 9, the leader or another player could exceed the value produced for the enhanced tournament play result to place the player in the desired ranking. This may be a problem particularly where the desired ranking includes some sort of graphic effects that indicate to the player that they have been placed in that particular ranking. For example, implementations of a tournament game may cause the displays or at least one of the displays at a gaming machine to change background colors to indicate a particular rank. In a particular example, the displays may change to a red background color when the player is in first place in the tournament. Depending upon the delay in the time that the leader point total is obtained at a gaming machine and the time that the player hits the enhanced tournament play result at the gaming machine, either the display will not show the desired ranking effect, or will show the desired effect for a very short time period.

In order to avoid the potential problem of showing the desired ranking change at a gaming machine for only a short period of time, processes according to the invention may simply delay an update of the ranking at the gaming machine for one or more cycles after an enhanced tournament play result has been awarded at the gaming machine. For example, a gaming machine may cause the leaderboard ranking to be updated immediately upon the award of an enhanced tournament play result. In order to ensure that the desired ranking is shown at the gaming machine for a reasonable length of time, the gaming machine may simply not update the ranking at that gaming machine in response to the next point total data received from the tournament server. After one or more point totals from the tournament server have been skipped or ignored, the point total may then again be updated normally at the gaming machine until the next enhanced tournament play result is awarded.

This update skipping process is illustrated in FIG. 10, which shows a process performed at a given gaming machine in a tournament system. First, it should be noted that FIG. 10 assumes that the gaming machine updates its local player ranking display immediately once an enhanced tournament play result is awarded to place that player in the desired ranking. With this assumption in mind, FIG. 10 shows that the ranking is initially set in some suitable fashion at process block 1001. This may include delaying an initial ranking until clear rankings are possible. Once every given period of time, the gaming machine receives point data from the tournament server as shown at 1002. If there has been no enhanced tournament play result awarded at the gaming machine since the last update, as indicated by a negative result at decision box 1004, the gaming machine uses the data received according to block 1002 to update the ranking shown at the gaming machine normally as indicated at block 1005. This ranking may be shown in an upper display device as shown in the example of FIG. 4, and the player's ranking may also be indicated in the dashboard display in FIG. 4.

If the gaming machine has been awarded an enhanced tournament play result since the last receipt of data at block 1002, then decision box 1004 produces a positive result and skips the normal update indicated at process block 1005. This skipping of the normal ranking update according to data received from the tournament server may be done using one or more cycles of update data received at process block 1002.

It will be noted here that by skipping an update of the leaderboard or ranking at a given gaming machine in a tournament, the particular gaming machine may show a different ranking than the ranking shown on a community or overhead display such as display device 313 FIG. 3 and FIG. 5. However, once the designated number of ranking updates have been skipped at the given gaming machine in response to the award of an enhanced tournament play result, the leaderboard at the gaming machine will once again update the locally displayed leaderboard normally and place that gaming machine in condition in which it is consistent with the leaderboard shown on a community display.

As used in the foregoing description and the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above-described example embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method for awarding prizes in a tournament gaming system, the method including:

(a) receiving a tournament play input at a gaming machine, the tournament play input being associated with a tournament participant;

(b) obtaining a tournament play result for the tournament play input;

(c) determining whether an enhanced tournament play result is to be awarded for the tournament play input or for an additional event in the course of tournament play;

(d) where it is determined that the enhanced tournament play result is to be awarded for the respective tournament play input or additional event, determining an enhanced tournament result value, the enhanced tournament result value comprising a value sufficient to place the tournament participant at a predetermined tournament ranking;

(e) awarding the enhanced tournament result value at the gaming machine; and (f) displaying the tournament participant in the predetermined tournament ranking at a display device associated with the gaming machine.

2. The method of claim 1 wherein the predetermined tournament ranking is first place.

3. The method of claim 1 wherein determining whether the enhanced tournament play result is to be awarded includes determining whether an enhancement constraint applies to the respective tournament play input or additional event, and if the enhancement constraint applies, preventing the enhanced tournament play result from being awarded.

4. The method of claim 3 wherein the enhancement constraint includes a current tournament ranking for the tournament participant.

5. The method of claim 3 wherein the enhancement constraint includes a time value within a time period for the tournament.

6. The method of claim 3 wherein the enhancement constraint includes a current point total for the tournament participant.

7. The method of claim 3 wherein preventing the enhanced tournament play result from being awarded includes obtaining the tournament play result for the respective tournament play input from a result set which excludes the enhanced tournament play result.

8. The method of claim 3 wherein preventing the enhanced tournament play result from being awarded includes disregarding the enhanced tournament play result if the enhanced tournament play result is the tournament play result obtained for the respective tournament play input.

9. The method of claim 1 further including displaying the tournament participant in the predetermined tournament ranking at the display device associated with the gaming machine for an extension time period by disregarding a tournament standing data input at the gaming machine.

10. The method of claim 1 further including displaying an indication of the predetermined tournament ranking at the display device or another display device at the gaming machine, the indication of the predetermined tournament ranking comprising an indication in addition to a leader board indicator.

11. The method of claim 10 wherein displaying the indication of the predetermined tournament ranking includes displaying a predetermined background color at the display device or the other display device.

12. A gaming system including:

(a) one or more display devices;

(b) a player input system;

(c) at least one processor; and (d) at least one memory device storing instructions executable by the at least one processor to:

(i) receive a tournament play input in the gaming system, the tournament play input being associated with a tournament participant;

(ii) obtain a tournament play result for the tournament input;

(iii) determine whether an enhanced tournament play result is to be awarded for the tournament play input or for an additional event in the course of tournament play;

(iv) where it is determined that the enhanced tournament play result is to be awarded for the tournament play input or additional event, determine an enhanced tournament result value, the enhanced tournament result value comprising a value sufficient to place the tournament participant at a predetermined tournament ranking;

(v) award the enhanced tournament result value; and (vi) cause the tournament participant to be displayed in the predetermined tournament ranking at least at one of the one or more display devices of the gaming system.

13. The gaming system of claim 12 wherein the predetermined tournament ranking is first place.

14. The gaming system of claim 12 wherein determining whether the enhanced tournament play result is to be awarded includes determining whether an enhancement constraint applies to the tournament play input or the additional event, and if the enhancement constraint applies, the instructions are executable to prevent the enhanced tournament play result from being awarded.

15. The gaming system of claim 14 wherein the enhancement constraint includes a current tournament ranking for the tournament participant.

16. The gaming system of claim 14 wherein the enhancement constraint includes a time value within a time period for the tournament.

17. The gaming system of claim 14 wherein the enhancement constraint includes a current point total for the tournament participant.

18. The gaming system of claim 14 wherein the at least one processor is operable to prevent the enhanced tournament play result from being awarded by obtaining the tournament play result for the tournament play input from a result set which excludes the enhanced tournament play result.

19. The gaming system of claim 12 wherein the at least one memory device stores instructions executable by the at least one processor to cause the tournament participant to be displayed in the predetermined tournament ranking at the display device for an extension time period by disregarding a tournament standing data input in the gaming system.

20. A program product comprising one or more non-transitory data storage devices storing program code, the program code including:

(a) player input program code executable to receive a tournament play input through a gaming machine;

(b) tournament program code executable to obtain a tournament play result for the tournament play input;

(c) enhancement control program code executable to:

(i) determine whether an enhanced tournament play result is to be awarded for the tournament play input or for an additional event in the course of tournament play;

(ii) where it is determined that the enhanced tournament play result is to be awarded for the tournament play input or additional event, determine an enhanced tournament result value, the enhanced tournament result value comprising a value sufficient to place a tournament participant at a predetermined tournament ranking; and (iii) award the enhanced tournament result value at the gaming machine; and (d) tournament display program code executable to display the tournament participant in the predetermined tournament ranking at a display device associated with the gaming machine.

21. The program product of claim 20 wherein the predetermined tournament ranking is first place.

22. The program product of claim 20 wherein determining whether the enhanced tournament play result is to be awarded includes determining whether an enhancement constraint applies to the tournament play input or additional event, and if the enhancement constraint applies, the enhancement control program code is executable to prevent the enhanced tournament play result from being awarded.

23. The program product of claim 22 wherein the enhancement constraint includes a current tournament ranking for the tournament participant.

24. The program product of claim 22 wherein the enhancement constraint includes a time value within a time period for the tournament.

25. The program product of claim 22 wherein the enhancement constraint includes a current point total for the tournament participant.

26. The program product of claim 22 wherein the enhancement control program code is executable to prevent the enhanced tournament play result from being awarded by causing the tournament program code to obtain the tournament play result for the tournament play input from a result set which excludes the enhanced tournament play result.

27. The program product of claim 20 wherein the tournament display program code is also executable to cause the tournament participant to be displayed in the predetermined tournament ranking for an extension time period by disregarding a tournament standing data input at the gaming machine.

* * * * *